United States Patent [19]
Maier

[11] Patent Number: 5,124,933
[45] Date of Patent: Jun. 23, 1992

[54] METHOD AND APPARATUS FOR DETERMINING A QUANTITY OF LIQUID IN A TANK WHEN AT LEAST ONE SENSOR IS INOPERATIVE

[75] Inventor: Lawrence C. Maier, Middlebury, Vt.

[73] Assignee: Simmonds Precision Products, Inc., Wilmington, Del.

[21] Appl. No.: 311,449

[22] Filed: Feb. 16, 1989

Related U.S. Application Data

[63] Continuation of Ser. No. 43,622, Apr. 28, 1987, abandoned.

[51] Int. Cl.$^5$ .............................................. G01F 23/00
[52] U.S. Cl. .................... 364/509; 340/612; 340/618; 73/290 R
[58] Field of Search ........ 364/509; 340/612, 618–625; 73/290 R, 281, 295, 299, 304 R, 304 C

[56] References Cited

U.S. PATENT DOCUMENTS

| | | | |
|---|---|---|---|
| 4,352,159 | 9/1982 | Colby | 364/509 |
| 4,601,201 | 7/1986 | Oota et al. | 364/509 |
| 4,736,329 | 4/1988 | Ferretti et al. | 364/509 |
| 4,739,494 | 4/1988 | Torii | 364/509 |

Primary Examiner—Parshotam S. Lall
Assistant Examiner—Brian M. Mattson
Attorney, Agent, or Firm—Dale R. Lovercheck

[57] ABSTRACT

A method and apparatus determines a quantity of liquid in a tank when at least one liquid sensor is inoperative. In a first embodiment, a plurality of tables are stored in memory which are grouped by identities of the possible inoperative sensor or sensors. One group of tables is selected based on the identified inoperative sensor or sensors. Then, that one group of tables is accessed, and the quantity of liquid in the tank is calculated based on the readings of the operative sensors. In a second embodiment, a first plurality of tables stores quantity readings for each sensor as if all sensors are operable. A second plurality of tables includes one table for each possible configuration of inoperative sensor or sensors. When the inoperative sensor or sensors are identified, one particular table in the second plurality is accessed and a quantity amount is then added to the liquid quantities determined from the first plurality of tables to provide a total liquid quantity in the tank. Preferably, all tables are loaded with liquid quantity values based upon studies emulating a variety of tank and liquid positional attitude.

14 Claims, 2 Drawing Sheets

METHOD AND APPARATUS FOR DETERMINING A QUANTITY OF LIQUID IN A TANK WHEN AT LEAST ONE SENSOR IS INOPERATIVE

This application is a continuation of application Ser. No. 043,622 filed Apr. 28, 1987 now abandoned.

BACKGROUND OF THE INVENTION

The present invention relates to a method and apparatus for determining a quantity of liquid in a tank when at least one liquid sensor disposed in the tank is inoperative. More particularly, the present invention relates to a liquid-quantity sensing system in which an accurate determination of liquid quantity may be made even though one or more of the liquid-level sensors in the tank are detected as being inoperative. While the present invention will be described with respect to aircraft fuel tank sensing systems, it is to be understood that the teachings of this application are applicable to any system requiring a determination of the quantity of liquid in a tank.

Known aircraft fuel tanks come in a wide variety of shapes and sizes. Typically, aircraft fuel tanks are enclosed within the wings and fuselage of the aircraft. The wings and fuselage also contain a number of structural supports, electrical cable conduits, and other obstructions requiring the fuel tank configuration to be quite varied. Thus, a single fuel sensor in each tank will be unable to accurately measure the amount of fuel within that tank. Therefore, a plurality of such fuel sensors are usually provided in each aircraft fuel tank. When one or more of these sensors is rendered inoperative, an accurate reading of the fuel quantity in the tank is difficult to obtain.

Furthermore, the dynamics of maneuvering aircraft frequently cause the level of fuel in the tank to be other than horizontal. FIGS. 1 and 2 depict cross-sectioned and plane views of a representative aircraft fuel tank. FIGS. 1 and 2 depict a fuel tank 2, together with level sensors 4, 6, 8, and 10. When the aircraft is grounded or flying straight and level, the level of fuel will describe a horizontal line, for example, line 12 in FIG. 1. However, as the aircraft banks, the local acceleration vector 14 will move from the vertical, thus causing fuel 16 to have a level which is off-horizontal, for example, the level 12 shown in FIG. 1.

Should one of the level sensors 4, 6, 8, or 10 become inoperative, the quantity of fuel in tank 2 must be calculated based on the outputs of the remaining operative sensors. The task of making up for the inoperative sensor is exacerbated by the forces imposed on fuel 16 during aircraft maneuvering. The present invention addresses this task.

One known method for recovering fuel quantity data in a system where one sensor is lost is described in U.S. Pat. No. 4,352,159 to Colby. In Colby, when one sensor is detected as being inoperative, an output signal from that sensor is estimated based on one or more sensors ("sister sensors") corresponding to the inoperative sensor. This estimate is based on a formula providing a linear estimate of the level of fuel at the missing sensor. Colby derives the estimated sensor output by multiplying the length of the inoperative sensor by the sum of the outputs of associated sister sensors divided by the sum of the lengths of the sister sensors. For example, (with reference to FIG. 1), if sensor 6 is inoperative, and sensors 4 and 8 detect a liquid level at line 12, then the output of missing sensor 6 is estimated to be at the level 12 also. Obviously, such a rough solution is accurate only when the level of the fuel in the tank is stable and assumes that fuel quantity apportioned to the missing probe is proportional to the missing probes length as a percentage of the total length of all probes. This is an approximation required by Colby and not required by the present invention. Furthermore, the system of Colby assumes only a single attitude of fuel within the tank and thus contains a significant error component for other possible fuel attitudes. Colby's linear approximation method assumes a single, usually horizontal, fuel level. If the aircraft maneuvers and shifts the acceleration vector from the vertical position, the fuel level will change thus making the linear approximation of Colby very inaccurate. Therefore, the system of Colby is extremely inaccurate when the quantity of fuel is to be measured while the aircraft is maneuvering or where the fuel level is in an attitude other than horizontal.

A further problem with the Colby system arises where one of the sister sensors is also inoperative. In such a case, estimates for all missing sensors are unobtainable thus providing an extremely inaccurate measure of fuel quantity in the tank.

In addition, Colby assumes a fairly horizontal configuration of the fuel tank itself. Referring to FIG. 1, if sensor 8 is inoperative, Colby estimates its fuel level by a linear approximation of sensors 6 and 10. Since sensor 10 is located much higher in fuel tank 2, its reading will be very low where the fuel is horizontal. On the other hand, the level tank of fuel at sensor 6 will be quite high. Colby makes a linear approximation between a low reading of sensor 10 and a higher reading of sensor 6 to provide a mid-range reading estimate for inoperative sensor 8. Such a solution would be inaccurate since the estimate of an operative sensor 8 should also be in the area of line 12. Therefore, the Colby system is not optimum for oddly configured fuel tanks.

Yet a further disadvantage of the Colby system is the length of time required to calculate the linear approximation of fuel quantity. The Colby system requires monitoring operative sensors and then performing multiplication and division which are computer-intensive operations. In a multi-sensor system, Colby may require too much time to provide a reading of fuel in the tank.

What is needed is a liquid quantity sensing system which takes into account many different attitudes of fuel within the tank of a maneuvering aircraft, and provides accurate data when one or more sensors is inoperative. Such a system should also provide a rapid output indicating the quantity of fuel in the tank.

SUMMARY OF THE INVENTION

The present invention provides an apparatus and a method for accurately measuring the quantity of liquid in a tank when at least one of the liquid sensors inside the tank is inoperative. The present invention renders accurate results regardless of the attitude of the liquid inside the tank by using predetermined look-up table values. The predetermined values are generated based on empirical studies or computer modelling regarding the different attitudes the liquid may take within the tank. Therefore, when a sensor is detected as being inoperative, a predetermined accurate estimate of fuel in the tank is obtained, rather than a mere one-attitude linear approximation of the level of the missing sensor based on surrounding "sister" sensors.

The present invention provides a system for measuring the quantity of liquid in a tank where the tank has a plurality N of liquid level sensors. Each liquid sensor provides a level signal corresponding to a level of liquid sensed at that sensor. The output signals from the plurality of level sensors are received by a processor. From the signal levels of the received signals, any inoperative sensors are detected.

In a first embodiment, the received signals are passed to a processor which stores a plurality of tables. The tables are grouped in sets which correspond to the sensor or sensors which are identified as being inoperative. Each group of tables contains one table for each sensor that is still operative. Each table lists a plurality of liquid level heights and corresponding liquid quantities for those heights.

When a sensor is detected as being inoperative, the appropriate group of tables is selected which contains tables for all other sensors other than the inoperative one(s). Then, the level signals from the operative sensors are read and the appropriate tables from that group are accessed to read the corresponding quantities of liquid therefrom. The quantities of liquid stored in these tables are higher than the quantities that would be obtained if all sensors were working. The higher quantities are derived as if the missing sensor did not exist. The quantities of liquid from each table in the group are then summed to provide a total quantity of liquid in the tank.

Preferably, the tables contain quantity values which were derived from a plurality of studies carried out for a wide variety of different liquid attitudes within the tank. Thus, the quantity values stored in the tables are not linear approximations of neighboring sensors, but empirically determined or computer-modeled quantity values configured for the actual attitude of fuel in the tank.

According to a second embodiment, first and second pluralities of tables are stored in the processor. The first plurality of tables corresponds one to one to each sensor in the tank. The second plurality of tables contains only one table for each of the possible combinations of inoperative sensors. That one table combines values from all other operative sensors. For example, if a first sensor has failed a table in the second plurality may combine readings from second and third operative sensors. Likewise, if the first and second sensors are both bad, the table in the second plurality may correspond only to the output of the third sensor. In the second embodiment, the processing device receives the output signals from the sensors and first accesses the first plurality of tables to determine the quantity of liquid corresponding to the operative sensors. Then, the processor accesses the table from the second plurality of tables which corresponds to the particular combination of inoperative sensors detected by the processor using the value or values corresponding to the operative sensors. The quantity of fuel read from the first plurality of tables and the quantity of fuel read from the second plurality of tables are then summed to provide the proper quantity of liquid in tank.

As with the first embodiment, it is preferable for the liquid quantity values stored in the processor in the second embodiment to be derived from empirical studies or computer modeling utilizing several different attitudes of liquid within the tank.

As described above, each embodiment provides an accurate, reliable, predictable, and rapid system for providing the quantity of liquid in a tank, particularly a tank containing a liquid which may take on a number of different attitudes.

BRIEF DESCRIPTION OF THE DRAWINGS

The advantageous structure and methods according to the present invention will be more clearly understood from the following detailed description of the presently preferred exemplary embodiment when taken together with the attached drawings in which.

DETAILED DESCRIPTION OF THE PRESENTLY PREFERRED EXEMPLARY EMBODIMENT

Figure 1:
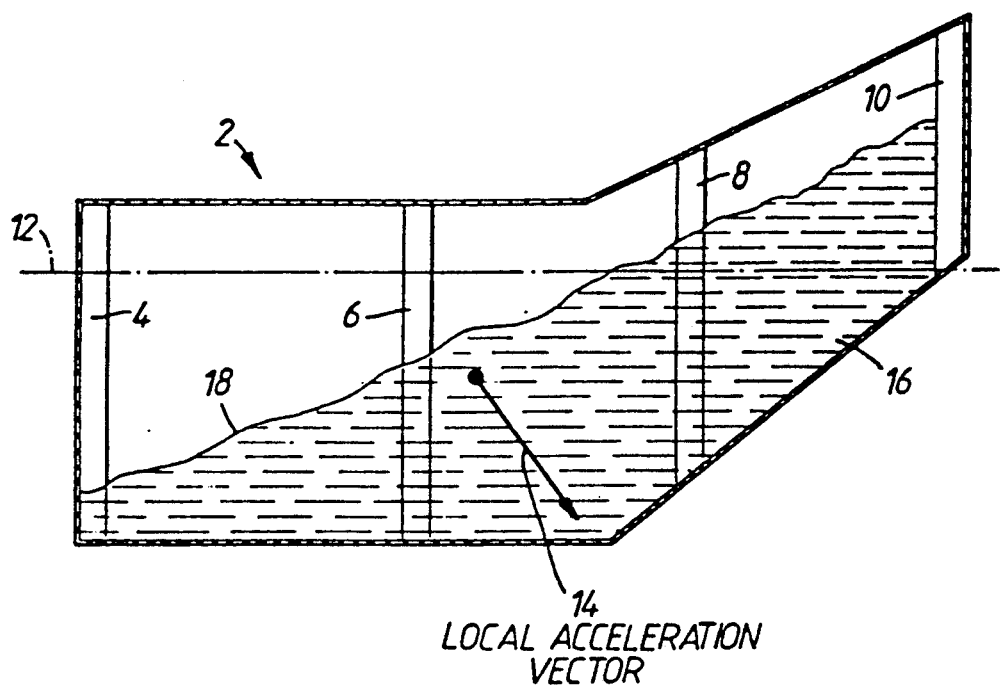
FIG. 1 is a cross-sectional view of the liquid in the tank.
Figure 2:
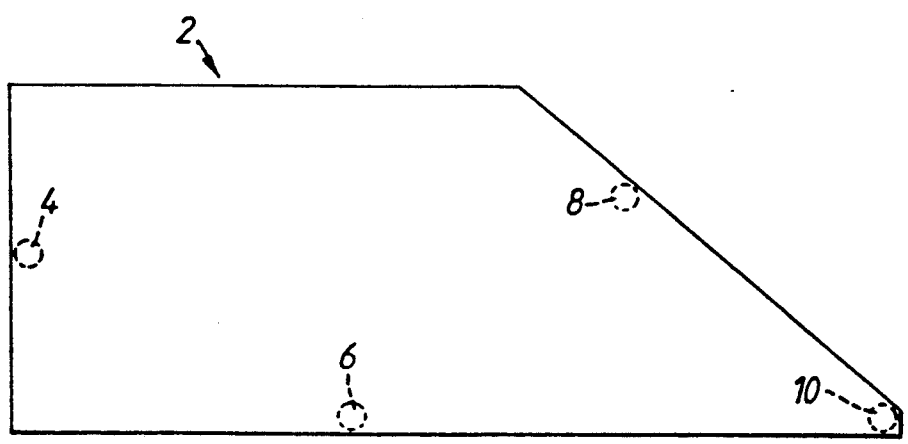
FIG. 2 is a top plane view of the tank of FIG. 1.

The present invention is adapted for use in liquid quantity measuring systems wherein the accuracy of the measurement is degraded upon the loss of one or more sensors. In the aircraft industry, the basic sensor for measuring fuel volume or quantity has long been the capacitance sensor which has been accepted for many years as a rugged and reliable device. The capacitive probe is positioned within the fuel tank and typically includes structure which defines capacitor plates, or the functional equivalent, with the dielectric constant between the plates being determined by the level of fuel within the tank, as well as the air in the airspace above the fuel. The sensed capacitance is a function of the fuel level in the tank. In fact, a novel advance in the art of conditioning the signal output from such sensors is described in my co-pending U.S. patent application (Ser. No. 07/042,229) entitled, "APPARATUS AND METHOD FOR DETERMINING RESISTANCE AND CAPACITANCE VALUES" filed Apr. 24, 1987, the teachings of which are expressly incorporated herein by reference.

Output signals from the plurality of sensors within the fuel tank are fed to a microcomputer or similar processing device which provides an output signal containing the total quantity of fuel within the tank.

In order to improve the accuracy of the microcomputer output signal, the microprocessor memory is loaded with predetermined quantity values for the particular tank in question. For example, the sensor gauging accuracy is improved by deriving the fuel quantity information from a computerized study which takes into account such characteristics as tank shape, tank volume, tank attitude, and the local acceleration vector of the fuel. The computer analyzes the tank shape and attitudes, etc. and then derives a table of values for each sensor that will give maximum accuracy. Basically, a table of fuel quantity values may be derived for each of a plurality of tank shapes and attitudes. Alternatively, a single table may be derived containing fuel quantity data which has been normalized for all expected tank shapes, attitudes, etc. The present invention will work in either system.

Each table stored in the processor memory includes a plurality of liquid heights for each sensor with corresponding fuel quantities for each height. The fuel quantities are preferably predetermined in accordance with the computerized modeling described above, but may also be generated through empirical experimentation. When the processor receives the output signals from each of these sensors, it accesses the plurality of tables and derives a fuel quantity amount from each table. Then, the processor sums these fuel quantities to derive the total fuel quantity within the tank. A novel technique for performing the above manipulations with the tables is set forth in my copending U.S. patent application (Ser. No. 07/043,500) entitled, "APPARATUS AND METHOD FOR DETERMINING LIQUID LEVELS", filed Apr. 28, 1987 the teachings of which are expressly incorporated herein by reference.

The missing probe recovery technique according to the present invention addresses the problem where one or more sensors in an array of sensors is inoperative, thus making accurate quantity measurement impossible. Given a fuel tank of arbitrary and non-uniform shape with a dynamic liquid load, an array of sensors which senses the liquid height at each sensor is disposed in the tank. A table of values is stored in the processor which relates the height of liquid at each sensor to gallons of fuel in the tank. By adding the gallons associated with each sensor together, the total gallons contained in the tank is determined. Shown below is a typical set of tables for a three sensor system. However, it should be remembered that this invention is applicable to any multi-sensor liquid-quantity measuring system.

TABLE 1

| Sensor 1 | | Sensor 2 | | Sensor 3 | |
|---|---|---|---|---|---|
| Height | Gallons | Height | Gallons | Height | Gallons |
| 1 | 10 | 1 | 8 | 1 | 2 |
| 2 | 15 | 2 | 16 | 2 | 6 |
| 3 | 20 | 3 | 20 | 3 | 10 |
| 4 | 25 | 4 | 22 | 4 | 12 |

In an example using the system of Table 1, it is assumed that the liquid height sensed at Sensor 1 is 3, at Sensor 2 is also 3, and at Sensor 3 is likewise 3. Then, the total gallons of fuel in the tank is 20+20+10=50 gallons. It can be seen that if one of the sensors is rendered inoperative, then it is impossible, given the tables shown, to calculate the correct fuel quantity in the tank. The present invention proposes two schemes for overcoming the problem of a missing probe or probes. The first method is very accurate but memory requirements within the processor are intensive. The second method is slightly less accurate, but requires a minimum of additional memory space.

According to the first embodiment, a set of tables for each sensor is derived assuming that a given one or number of sensors is missing. These tables correspond to the tables that would have been derived had the missing sensor never existed. For example, the computer-generated fuel quantity values stored in the tables are derived without regard to a missing sensor. With reference to FIG. 1, the fuel quantities may be derived as if Sensor 4 and/or 8 never existed. Thus, the output signals from the operative sensors only are used to generate the fuel quantity amounts stored in the tables.

For the example given with reference to Table 1, there would be two tables provided for a Sensor 1 inoperative condition. Likewise, two tables would be provided for a Sensor 2 inoperative condition, and two tables would be provided for a Sensor 3 inoperative condition. Examples of these tables are shown below.

TABLE 2

| SENSOR 1 FAILED | | | |
|---|---|---|---|
| Sensor 2 | | Sensor 3 | |
| Height | Gallons | Height | Gallons |
| 1 | 15 | 1 | 7 |
| 2 | 23 | 2 | 14 |
| 3 | 30 | 3 | 20 |
| 4 | 34 | 4 | 25 |

In the above example, both Sensors 2 and 3 detect fuel at height 3. Therefore, the amount of fuel in the tank is 30+20=50. This corresponds to the result earlier obtained, wherein no sensors were bad.

TABLE 3

| SENSOR 2 FAILED | | | |
|---|---|---|---|
| Sensor 2 | | Sensor 3 | |
| Height | Gallons | Height | Gallons |
| 1 | 14 | 1 | 6 |
| 2 | 23 | 2 | 14 |
| 3 | 30 | 3 | 20 |
| 4 | 36 | 4 | 23 |

According to the above example, if Sensors 1 and 3 both detect fluid at a height of level 3, the total of fuel in the tank is 30+20=50. Again, this corresponds to the result obtained when no sensors are detected as inoperative.

TABLE 4

| SENSOR 3 FAILED | | | |
|---|---|---|---|
| Sensor 2 | | Sensor 3 | |
| Height | Gallons | Height | Gallons |
| 1 | 11 | 1 | 9 |
| 2 | 18 | 2 | 19 |
| 3 | 25 | 3 | 25 |
| 4 | 31 | 4 | 28 |

Again, according to the above example, if each of Sensors 1 and 2 detect fluid at a level of 3, then the quantity of fuel in tank is equal 25+25=50. Again, this corresponds to the result as if no sensors were bad.

Note in the first embodiment that a number of groupings of tables are made. Each grouping corresponds to a condition where one (or more) sensors are detected as being bad. For example, it is known that aircraft fuel tanks may include anywhere from three to twenty sensors. Thus, all possible permutations and combinations of bad sensors may be taken into account in providing tables corresponding to the first embodiment. When a particular sensor or sensors are detected as being inoperative, the appropriate grouping of tables is selected. Then, readings from the operative sensors are accessed to the selected group of tables to provide the appropriate fuel quantity amounts to be summed. In the first embodiment, the normal fuel quantity values stored in the first plurality of tables according to Table 1 are selected when no sensors are detected as being inoperative. Then, when a sensor or sensors are detected as being inoperative, the appropriate grouping of tables from the second plurality of tables according to Tables 2, 3, and 4 are selected and accessed with the level signals from the operative sensors within the tank.

It can be seen that according to the first embodiment, very accurate results may be achieved since a grouping of tables is provided for each combination of inoperative sensors. The first embodiment uses the power of the computer-generated predetermined values to derive the very best values to use for all of the operating sensors. Thus, the computer-generated predetermined fuel quantity values may be derived by operating the computer analysis program with only the operating probes present. As far as the computer analysis program is concerned, the failed sensors do not exist. Thus, the tables derived are the best possible accuracy achievable without the use of the designated failed sensor. The requirement for storage is intense since a grouping of tables must be provided for each permutation of failed sensors possible. Where twenty sensors are present in the tank, this memory requirement is quite large. In the simple case where one sensor fails, $N_2$ tables must be provided.

According to the second embodiment, fuel quantity accuracy may be traded-off for a lower memory requirement. The second embodiment stores only one table for each combination of sensors which fails, in addition to the all-sensors operative tables as depicted in Table 1. Thus, a first plurality of tables is provided according to normal operating conditions, and a second plurality of tables is provided for the case where one or more sensors are inoperative.

In the second plurality of tables, a table is stored for each combination of failed sensors and provides a gallon contribution for that failed sensor or sensors. In a particularly convenient embodiment, the address for each of the tables in the second plurality is the sum of the gallons determined from the operative sensors according to the first plurality of tables (as depicted in Table 1). Thus, the level signals from each of the operative sensors is first provided to the first plurality of tables and a quantity of fuel for operative sensors is derived. Then, this total quantity amount is used to address the particular table in the second plurality of tables which corresponds to the given failed sensor configuration. This fuel quantity amount will, for example, be the address in the particular table in the second plurality. This address will then provide a gallon amount which is to be added to the quantity of fuel derived from the first plurality of tables to produce a total fuel quantity in the tank. An example is given below:

TABLE 5

| Sensor 1 Failed | | Sensor 2 Failed | | Sensor 3 Failed | |
|---|---|---|---|---|---|
| Gal 2 + 3 | Gallons | Gal 1 + 3 | Gallons | Gal 1 + 2 | Gallons |
| 10 | 10 | 12 | 8 | 18 | 2 |
| 22 | 15 | 21 | 16 | 31 | 6 |
| 30 | 20 | 30 | 20 | 40 | 10 |
| 34 | 25 | 37 | 22 | 47 | 12 |

According to the example used earlier, assume that Sensor 2 has failed. From the quantities given in Table 1, the value of Sensor 1 is 20 gallons, and the value of Sensor 3 is 10 gallons, thus, the total quantity of the two operative sensors is $20 + 10 + = 30$. Using this value, the Sensor 2 Failed Table is addressed. At the address 30, the corresponding quantity of 20 gallons is read, and the total fuel quantity in the tank is then $30 + 20 = 50$.

The second embodiment requires significantly less storage, but is only accurate at the set of conditions under which the sensor-failed data are derived. The second embodiment selects the most common set of conditions to be found in the tank, for example, normalizing the liquid levels of the most expected attitudes of fuel within the tank. The tables representing these conditions are then analyzed by assuming one or more sensors have failed, adding the values of all operating sensors together at each fuel level and noting the contribution of a failed sensor at each fuel level. Thus, the sum of the remaining sensors acts as the address to determine the contribution of the failed sensor at the set of conditions under which the table was derived.

The above examples of the first and second embodiments are necessarily simple, but they properly illustrate the nature of the two methods of providing reasonably accurate liquid quantities when one or more of a group of sensors has failed. Since the tables may be derived from empirical or computer-generated studies using actual tank and liquid attitude figures, extremely accurate results are obtainable. Those having skill in this field will realize the advantages of the present invention from known systems, for example, Colby, wherein only linear approximations are obtainable.

Figure 3:
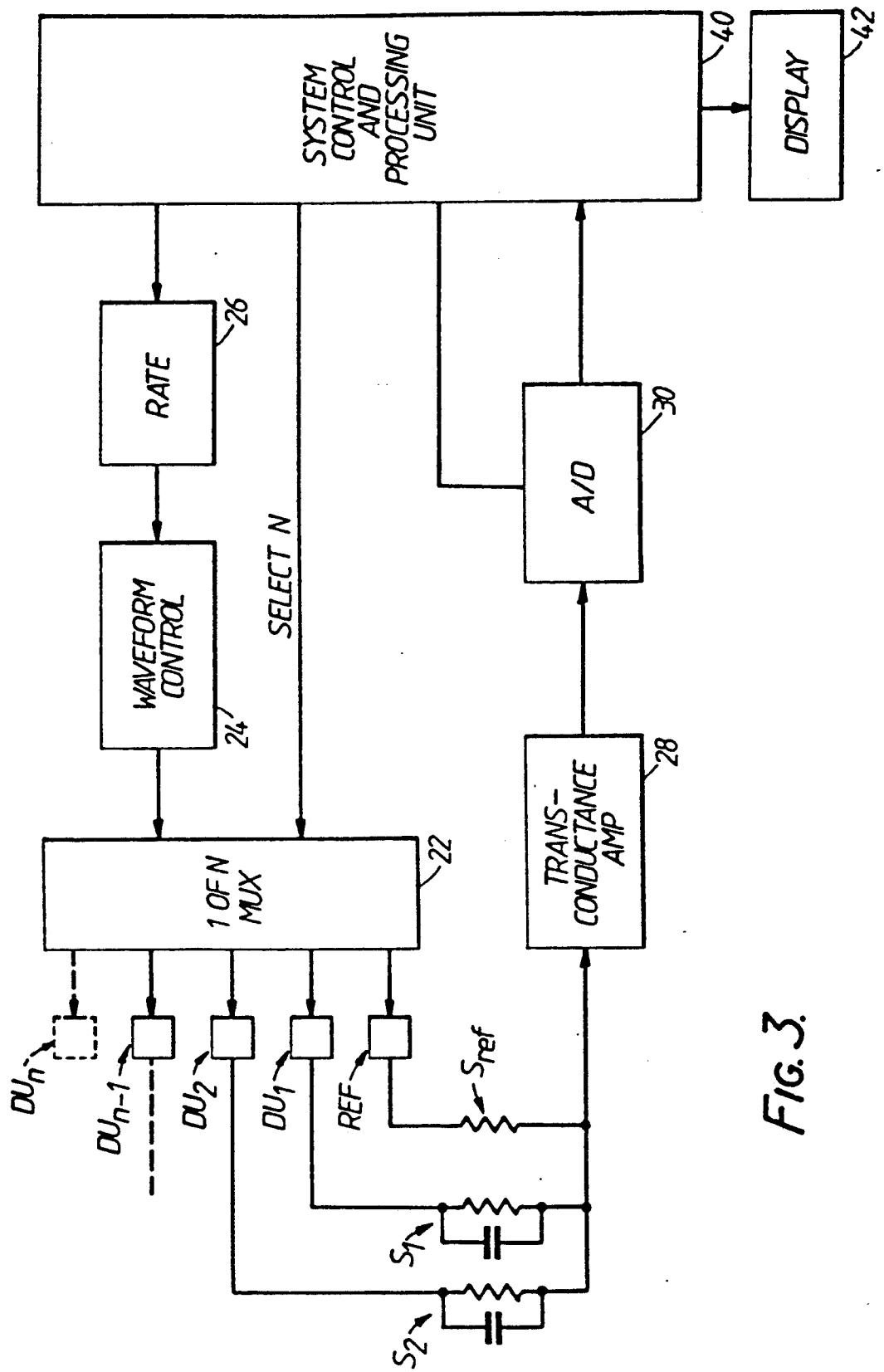
FIG. 3 is a block diagram depicting the apparatus according to the present invention.

FIG. 3 depicts the apparatus according to the present invention. Sensors $S_l$ to $S_n$ each include a capacitor and a resistance value, more fully described in my co-pending application, 07/042,229 entitled, now abandoned. "APPARATUS AND METHOD FOR DETERMINING RESISTANCE AND CAPITANCE VALUES. Sensors $S_1$-$S_2$ are driven by drive units $DU_l$-$DU_n$. The drive units are driven by the multiplexer 22, which in turn is fed by waveform control 24, rate of change device 26, and processor 40.

The outputs of Sensors $S_l$-$S_n$ are provided to transconductance amplifier 28, analog-to-digital converter 30, where they are digitized and transmitted to the processing unit 40.

The embodiment of FIG. 3 operates to selectively poll the sensor reference $S_{ref}$ and the various sensors $S_n$. For example, the processing unit 40 controls the multiplexer 22 to select the sensor reference $S_{ref}$ and controls the waveform control 24 to provide appropriate interrogation voltage waveforms to the sensors. The current drawn through the sensor reference $S_{ref}$ is converted by the transconductance amplifier 29 to a voltage which, in amplified form through the A/D converter 30, is provided to the processor 40.

Each of the sensors $S_n$ is interrogated in a sequential manner with the output signals being provided to the processor 40. Where an output signal from a particular sensor is above or below respective high and low threshold amounts, it may be determined that the sensor is inoperative (shorted or opened). In such a manner, the inoperative sensor or sensors may be identified by their position in the polling sequence.

Conveniently, a display unit 42, for example a digital LED display, may be coupled to the processor for displaying the total fuel quantity calculated by the processor.

All tables according to either embodiment may be suitably tailored to accurately emulate a specific system which is to be quantified. For example, each tank shape and dynamic liquid loading configuration can be readily replicated and accounted for in the tables of the present invention. According to the first embodiment, a plurality of attitudes may be taken into account, while the second embodiment takes into account a single composite attitude. Nevertheless, the attitude error component according to either embodiment of the present invention is very low, as contrasted to the Colby system which has a high error component for different attitudes.

The present invention utilizes off-the-shelf components. For example, the level sensors are well known and in present use. Likewise, the processor according to the present invention may be any convenient microprocessor, for example, an INTEL 80C31. Thus, the present invention proposes to utilize known components in a novel way.

A particular advantage of the present invention is its adaptability for all known fuel-gauging systems. The two embodiments described above allow a trading-off process to be carried out for any particular adaptation. For example, where accuracy does not need to be extreme, and memory requirements are limited, the second embodiment may be appropriate. Likewise, where the accuracy requirement is high but memory is inexpensive, the first embodiment may be appropriate. This method of trading-off between accuracy and memory size allows a wide range of liquid gauging systems to be realized.

Thus, what has been described above are method and apparatus for accurately and reliably measuring a quantity of liquid in a tank when one or more liquid level sensors are inoperative. Persons of skill in this field may readily perceive that a number of modifications may be made to the present invention without departing from the spirit and scope of the appended claims.

While the invention has been described in connection with what is presently considered to be the most practical and preferred embodiments, it is to be understood that this invention is not to be limited to the disclosed embodiments. On the contrary, the present invention is intended to cover various modifications and equivalent arrangements included within the spirit and scope of protection afford by the appended claims. The scope of the appended claims is to be accorded the broadest interpretation so as to encompass all such modifications and equivalent structures and methods.

I claim:

1. A method of measuring a quantity of liquid in a tank having a plurality of installed liquid level sensors, each said installed sensor while operative providing a level signal corresponding to a level of liquid sensed thereby, comprising the steps of:
   receiving the plurality of said level signals;
   detecting from said received level signals an identity of at least one inoperative sensor;
   storing a plurality of first tables, one table for each said installed sensor, each said first table representing a first predetermined quantity of liquid for each level sensed by a corresponding installed sensor;
   storing a plurality of second tables, one said second table for each possible configuration of operative and inoperative sensors, each said second table containing (1) a plurality of addresses, each said address corresponding to a sum of liquid quantities derived from certain tables of said plurality of first tables, said certain tables corresponding to operative sensors, and (2) a plurality of second predetermined liquid quantities, each corresponding to respective ones of said plurality of addresses;
   summing quantities of liquid from said plurality of first tables based on the received level signals from said operative sensors;
   determining a quantity of liquid from one table in said plurality of second tables, which said one table corresponds to one said inoperative sensor configuration; and
   combining the liquid quantities determined in said summing step and said determining step to provide the quantity of liquid in said tank.

2. The method according to claim 1 further including the step of determining the quantities of liquid represented by said first and second pluralities of tables based upon a plurality of positional attitudes of said liquid in said tank.

3. The method according to claim 1 further including the step of displaying said quantity of liquid in said tank determined in said combining step.

4. A method of measuring a quantity of liquid in a tank having a plurality N of installed liquid level sensors by using each operative sensor to provide a level signal corresponding to a level of said liquid at each said operative sensor, comprising the steps of:
   receiving said level signals from said N sensors;
   storing a first plurality N of tables, one table for each sensor, each table representing a first predetermined quantity of liquid corresponding to a plurality of levels of said level signal received from each said sensor;
   storing a second plurality of tables in groups, each said group corresponding to one possible configuration of inoperative sensors, each table in said second plurality of tables representing a second predetermined quantity of liquid for each said level of said level signal from a corresponding operative sensor;
   identifying from said level signals each inoperative sensor;
   selecting from said group of said second plurality of tables that group which corresponds to each said inoperative sensor;
   calculating a quantity of liquid in said tank from said first plurality of tables when no said installed sensors are detected as being inoperative;
   calculating a quantity of liquid in said tank from that group of tables selected from said second plurality of tables when at least one inoperative sensor is detected; and
   providing an output signal corresponding to the quantity of fuel in said tank.

5. The method according to claim 4 wherein said first and second pluralities of stored tables are both determined according to a plurality of positional attitudes of liquid in said tank.

6. A method of measuring a quantity of liquid in a tank having a plurality of N installed liquid level sensors, a number X of said installed sensors being inoperative, and a number of said installed sensors being operative, each X being at least 1 and less than N, said operative sensor providing a level signal corresponding to a sensed level of liquid at each said operative sensor,
   receiving a level signal from each said operative sensor;
   determining from the said received level signals an identity of said number X of inoperative sensors;
   storing a plurality of N first tables, one for each of said installed sensors, each said first table representing a first predetermined quantity of liquid for each of a plurality of liquid levels sensed by one of said installed sensors;
   storing a plurality of second tables, one for each of a plurality of combinations of inoperative sensors, each said second table representing a second predetermined quantity of liquid for each of a plurality of liquid levels sensed by said operative sensors;
   determining a first quantity of liquid in said tank from said plurality of first tables for said operative sensors; and determining a final quantity of liquid in said tank from said first quantity, said X in operative sensors, and said plurality of second tables.

7. The method according to claim 6 wherein said second determining step includes the step of summing liquid quantities from said first plurality of tables from tables whose associated sensors are operative, and wherein said second storing step includes the step of storing each quantity of liquid in each second table according to an address which approximates a sum corresponding to the sum determined in said second determining step, and wherein said third determining step includes the step of adding the sum determined in said second determining step to the represented quantity of liquid in said second plurality of tables whose address corresponds to the sum determined in said second determining step.

8. Apparatus for measuring a quantity of liquid in a tank having a plurality N of installed liquid level sensors, comprising:
 receiving means for receiving said level signals from said N sensors; and
 processing means coupled to said receiving means for (a) receiving said level signals from said receiving means, (b) storing a first plurality N of tables, one table for each installed sensor, each table representing a first predetermined quantity of liquid for each of a plurality of liquid levels represented by said level signals received from each said installed sensor, (c) storing a second plurality of tables in groups, each said group corresponding to one of a plurality of possible inoperative sensor configurations, each said table in said second plurality of tables representing a second predetermined quantity of liquid corresponding to said level signal from a corresponding operative sensor, (d) determining from said level signals an identity of said number X of at least one inoperative sensors, (e) selecting from said second plurality of tables that group which corresponds to the identified at least one inoperative sensor, (f) calculating a quantity of liquid in said tank from said first plurality of tables when no said installed sensors are detected as being inoperative, (g) calculating a quantity of liquid in said tank from that group of tables selected from said second plurality of tables when at least one inoperative sensor is detected; and
 (h) providing an output signal corresponding to the quantity of fuel in said tank.

9. Apparatus according to claim 8 wherein said processing means further includes means for storing said first plurality of tables with first quantity values which are predetermined for a plurality of positional attitudes of said liquid in said tank, and storing said second plurality of tables with second quantity values which are predetermined for said plurality of positional attitudes of said liquid in said tank.

10. A method of measuring a quantity of liquid in a tank having a plurality of liquid level sensors, comprising:
 providing a tank having a plurality of installed sensors, each said installed sensor while operative providing a level signal corresponding to a level of liquid;
 receiving the plurality of said level signals;
 detecting from said received level signals whether at least one of said sensors is inoperative, and an identity of said at least one inoperative sensor;
 storing a plurality of first tables, one table for each said installed sensor, each said first table representing a first predetermined quantity of liquid for each level sensed by a corresponding installed sensor;
 storing a plurality of second tables, one said second table for each possible configuration of inoperative sensors, each said second table containing (1) a plurality of addresses, each said address corresponding to a sum of liquid quantities derived from certain tables of said plurality of first tables, said certain tables corresponding to operative sensors, and (2) a plurality of second predetermined liquid quantities, each corresponding to respective ones of said plurality of addresses;
 summing quantities of liquid from said plurality of first tables based on the received level signals from said operative sensors;
 determining a quantity of liquid from one table in said plurality of second tables, which said one table corresponds to one said inoperative sensor configuration; and
 combining the liquid quantities determined in said summing step and said determining step to provide the quantity of liquid in said tank.

11. The method according to claim 10 further including the step of determining the quantities of liquid represented by said first and second pluralities of tables based upon a plurality of positional attitudes of said liquid in said tank.

12. A method of measuring a quantity of liquid in a tank comprising:
 providing a tank having a plurality of installed liquid level sensors, a portion of said sensors being operative and a portion of said sensors being inoperative, each said operative sensor providing a level signal corresponding to a sensed level of liquid at said each said operative sensor;
 receiving the plurality of level signals from each said operative sensor;
 determining from said received level signals an identify of each said inoperative sensor;
 storing a first plurality of tables, one of said first plurality of tables corresponding to at least one said installed sensor, each of said first plurality of tables representing a first predetermined quantity of liquid for each of a plurality of liquid levels sensed by at least one corresponding installed sensor;
 storing a second plurality of tables, one for each of a plurality of combinations of inoperative sensors, each of said second plurality of tables representing a second predetermined quantity of liquid for each of a plurality of liquid levels sensed by said operative sensors;
 determining a first quantity of liquid in said tank from said first plurality of tables for said operative sensors; and
 determining a final quantity of liquid in said tank from said first quantity, said at least one inoperative sensors, and said second plurality of tables.

13. A system for measuring a quantity of liquid in a tank comprising:
 providing a tank having a plurality of installed liquid level sensors, each operative sensor providing a level signal representative of a level of said liquid at said operative sensor;
 a receiver for receiving said level signals from said installed sensors; and processing means (a) receiving said level signals from said receiver, (b) storing a first plurality of tables, one of said tables being stored for each said installed sensor, each said table representing a first predetermined quantity of liquid for each of a plurality of liquid levels represented by said level signals received from each said installed sensor, (c) storing a second plurality of tables in groups, each said group corresponding to one possible configuration of inoperative sensors, each said table in said second plurality of tables representing a second predetermined quantity of liquid corresponding to said level signal from a corresponding operative sensor, (d) determining from said level signals an identity of at least one inoperative sensor, (e) selecting from said second plurality of tables that group which corresponds to the identified at least one inoperative sensor, (f) calculating a quantity of liquid in said tank from said first plurality of tables when no said installed sensors are detected as being inoperative, (g) calculating a quantity of liquid in said tank from that group of tables selected from said second plurality of tables when at least one inoperative sensor is detected; and (h) providing an output signal corresponding to the quantity of fuel in said tank, said processing means being coupled to said receiver.

14. The system according to claim 13 wherein said processing means further includes means for storing said first plurality of tables with first quantity values which are predetermined for a plurality of positional attitudes of said liquid in said tank.

* * * * *